Feb. 14, 1928.

R. J. OWENS 1,658,938

MACHINE FOR TREATING SEEDS FOR SMUT

Filed Nov. 26, 1926  2 Sheets-Sheet 1

Inventor
R. J. Owens
By his Attorneys

Feb. 14, 1928.
R. J. OWENS
1,658,938
MACHINE FOR TREATING SEEDS FOR SMUT
Filed Nov. 26, 1926    2 Sheets-Sheet 2
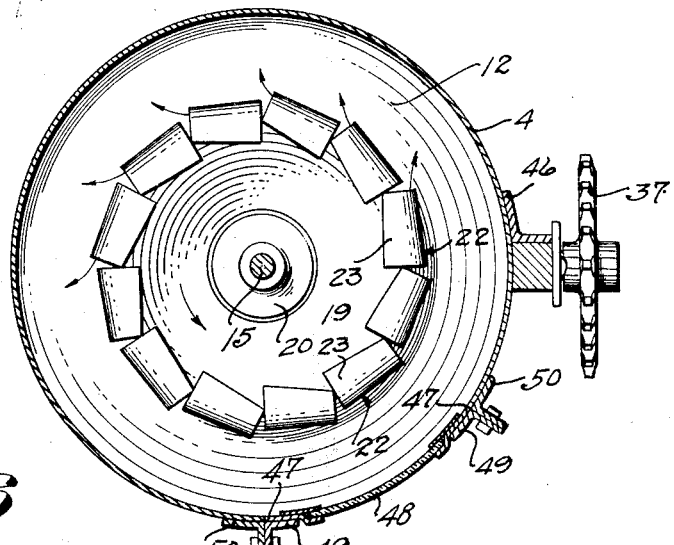
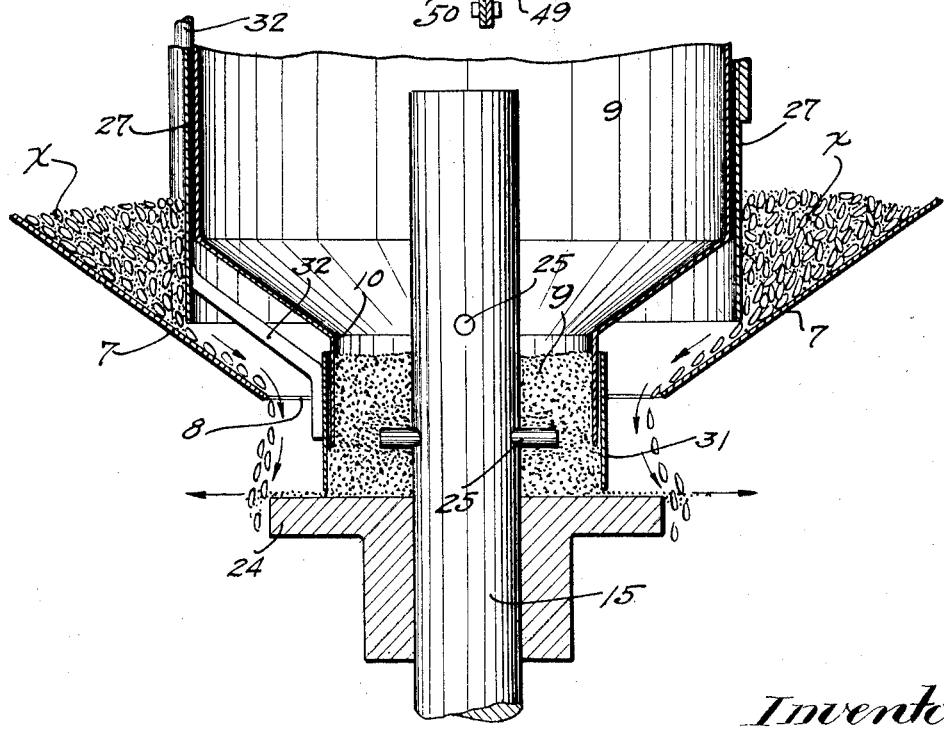
Inventor
R. J. Owens
By his Attorneys Patented Feb. 14, 1928.

1,658,938

UNITED STATES PATENT OFFICE.

ROBERT J. OWENS, OF MINNEAPOLIS, MINNESOTA.

MACHINE FOR TREATING SEEDS FOR SMUT.

Application filed November 26, 1926. Serial No. 150,788.

My invention has for its object to provide a simple and highly efficient machine for commingling materials, and is especially adapted for use in treating seeds for smut, and more particularly for coating seeds with a dry powder such as copper carbonate.

This method of treating seeds for smut by the use of copper carbonate has a marked advantage over the liquid treatment as with formaldehyde for the reason that by the use of my invention seeds may be treated a long time before sown, whereas, seeds receiving a wet treatment must be sown a relatively short time from said treatment.

The success of my invention resides in the fact that each seed is completely coated with copper carbonate and the action is to work this powder into all irregular, open or pitted surfaces of the seeds.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 2 is a view partly in plan and partly in horizontal section taken on the line 2—2 of Fig. 1; and Fig. 3 is a fragmentary view in central vertical section showing the feed controls for the hoppers and the spraying disk.

Figure 1:
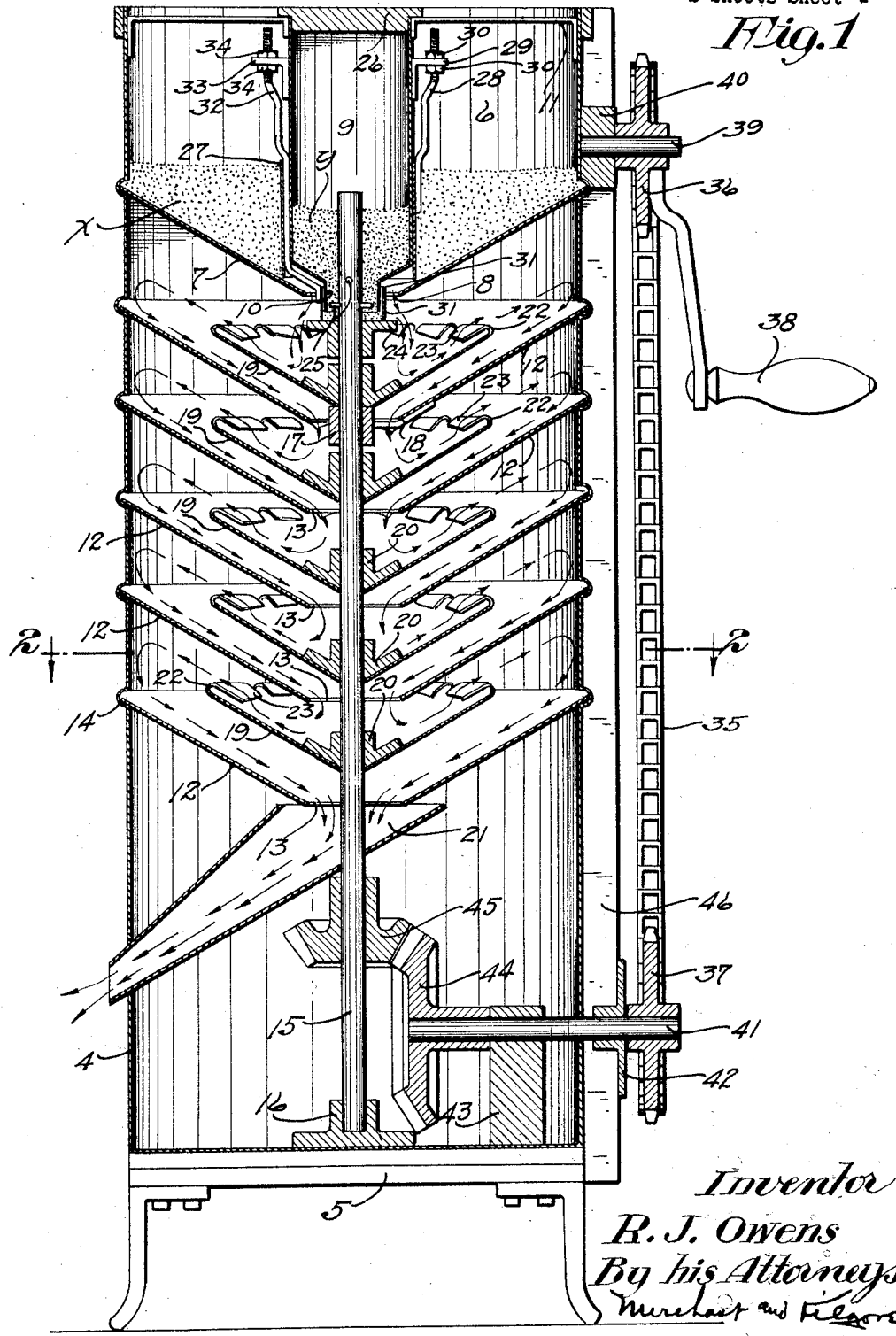
Fig. 1 is a view of the improved machine principally in central vertical section.

The numeral 4 indicates an upright cylindrical drum having an open top, a closed bottom, and supported on a leg-equipped base 5. The upper portion of the drum 4 affords an outer hopper 6, for controlling wheat or other seeds $x$ to be treated for smut, and the bottom thereof is provided with an axial passage 8. Centrally located in the hopper 6 is an inner hopper 9, the hopper bottom of which is axially spaced from the hopper bottom 7 and is provided with a depending discharge throat 10 that extends axially through the passage 8 and is spaced from said hopper bottom 7 to leave an annular passage therearound and is spaced from said bottom. The inner hopper 9 is held suspended in the outer hopper 6 by a spider 11 secured to the body of the drum 4.

A plurality of vertically spaced hopper-like return decks 12 are mounted in the drum 4 below the hopper 6 and are like the bottom member 7 of said hopper, and their axial openings 13 are of the same size as the passage 8. The hopper bottom 7 and the return decks 12 are secured to the drum 4 by forming in said drum vertically spaced corrugations 14 in which the peripheral portions of said bottom member and decks are mounted.

An upright driven shaft 15 has its lower end portion mounted in a step bearing 16 on the bottom of the drum 4 and extends axially through the openings 13 in the return decks 12 and the discharge throat of the hopper 9 and into said hopper. The shaft 15, at its upper end portion, is journaled in a bearing 17 having radial arms 18 attached to one of the return decks 12 at the under side thereof.

A plurality of axially spaced hopper-like mixing disks 19 are interposed between the hopper bottom 7 and the uppermost return deck 12 and between the other return decks 12. These mixing disks 19 have internal axially located hubs 20 through which the shaft 15 extends and to which said mixing disks are secured for rotation therewith. An inclined discharge spout 21 has its receiving end portion positioned under the axial opening 13 in the lowermost return deck 12 and its delivery end portion extends outward through one side of the drum 4.

On the periphery of each mixing disk 19 is a multiplicity of circumferentially spaced upwardly curved baffles 22 having inturned extensions 23 which overlie said disks and are spaced thereabove. Said baffles 22 are set to discharge past each other, as best shown in Fig. 2.

Secured to the shaft 15 for rotation therewith is a horizontal spraying disk 24, the upper face of which is spaced below the lower end of the discharge throat 10 and in a plane just above the baffle extensions 23 of the uppermost mixing disk 19. The hopper 9 is provided to hold a dry powder such as copper carbonate $y$ which is supported in said hopper by the spraying disk 24. Radial agitating pins 25 are secured to the shaft 15 and work in the discharge throat 10 during the rotation of the shaft 15 to cause a constant supply of copper carbonate $y$ to the spraying disk 24. A displaceable cover 26 is provided for the hopper 9.

The flow of wheat $x$ from the hopper 6 is controlled by a sleeve gate 27 telescoped onto the body of the hopper 9 for axial sliding adjustment to position its lower edge different distances above the hopper bottom 7 for the escape of wheat $x$ thereunder. The gate 27 may be operated and held in different adjustments by a screw-threaded feed rod 28 secured thereto and extending through an aperture in a bracket 29 on the hopper 9, and has applied thereto a pair of opposing nuts 30. The discharge of copper carbonate $y$ by the spraying disk 24 is controlled by a sleeve gate 31 telescopically mounted on the discharge throat 10 for axial adjustment in respect to said spraying disk. Said gate 31 may be adjusted and held where set by a screw-threaded rod 32 secured thereto and extending in the aperture in a bracket 33 on the hopper 9 and has applied thereto opposing nuts 34.

The shaft 15 is driven by the following connections, to wit: A sprocket chain 35 runs over upper and lower sprocket wheels 36 and 37, respectively, the former of which is provided with a hand crank 38 by which it may be turned. Said sprocket wheel 36 is loosely journaled on a trunnion 39 mounted in a bearing block 40, and the sprocket wheel 37 is rigidly secured to the shaft 41 journaled in inner and outer bearings 43 and 42, respectively. Rigidly secured to the inner end of the shaft 41 is a beveled gear 44 which meshes with a beveled pinion 45 rigidly secured to the shaft 15 for turning the same by operating the hand crank 38 in the direction of the arrow marked on Fig. 2. The bearing block 40 and bearing 42 are secured to an upright angle bar 46 secured to the drum 4 on the outside thereof. The bearing 43 is secured to the bottom of the drum 4.

Formed in the drum 4 is a door opening which extends substantially the full height of said drum and is normally closed by a displaceable door 47 having a transparent panel 48. Said door 47 extends substantially the full height of the drum 4 and has at its vertical edge portions angle bars 49 detachably bolted to angle bars 50 secured to the drum 4 at the vertical edge portions of the door opening therein.

The operation of the above described machine may be briefly described as follows:

Before starting the machine, the gates 27 and 31 are adjusted so that the desired amount of copper carbonate $y$ will be discharged into a given quantity of wheat $x$. The machine is then operated by turning the crank 38 and the wheat $x$ flows through the passage 8 and axially around the revolving spraying disk 24 in the form of a cylindrical curtain, and the spraying disk throws the copper carbonate $y$ in a thin horizontal sheet transversely into the wheat $x$ forming said cylindrical curtain and commingles therewith. After passing the spraying disk 24 the curtain of wheat $x$ is precipitated, together with the copper carbonate $y$, onto the uppermost revolving mixing disk 19. The wheat $x$ on the uppermost mixing disk 19 is thrown centrifugally to the outer edge portion thereof and certain of said wheat escapes between the baffles 22 and is precipitated onto the underlying return deck 12. The wheat $x$ stopped by the baffles 22 rolls back to the center of the mixing disk 19 to be again carried by centrifugal force to the outer edge of said disk. This action is repeated until all of the wheat is discharged between the baffles 22. The wheat $x$ precipitated onto the uppermost return deck 12 rolls down the same by gravity and onto the next underlying mixing disk 19 where the same is carried by centrifugal force to the periphery thereof and between the baffles 22 and precipitated onto the next underlying return deck 12. This action is repeated until the wheat is discharged into the spout 21 through the opening 13 in the lowermost return deck 12. From the discharge spout 21 the wheat may be collected in a bag or other receptacle.

After the machine has been in operation a relatively short time the upper surfaces of the mixing disks 19 and return decks 12 become coated with the copper carbonate $y$, and as the wheat $x$ is moved over the mixing disks 19 by centrifugal force and rolls back thereon under the action of gravity and as it also rolls under the action of gravity on the return decks 12, said wheat is completely coated with the copper carbonate $y$ adhering to said surfaces.

The operator can always observe the action of the machine through the sight opening 48. After the wheat $x$ has been treated and discharged from the machine the same may be stored until seeding time. The amount of copper carbonate $y$ used, of course, depends on the condition of the wheat. By removing the door 47 access may be had to the interior of the machine.

What I claim is:

1. A machine of the kind described having a hopper, a revoluble sprayer mounted below the discharge passage in the hopper to turn about a vertical axis, and means for delivering a material to said sprayer to be discharged thereby transversely into another material precipitating from the hopper to be commingled therewith.

2. A machine of the kind described having a hoppr for holding a material that is discharged therefrom in the form of a tubular curtain, a revoluble sprayer in said curtain below the discharge passage in the hopper, and means for delivering another material to said sprayer to be discharged thereby transversely into the material forming said curtain to commingle the same therewith.

3. A machine of the kind described having inner and outer hoppers for holding materials to be commingled, said outer hopper having a gate for causing the material therein to flow therefrom in the form of a cylindrical curtain, and a revoluble sprayer in said curtain below the discharge passage in the hopper, said inner hopper being arranged to discharge the material therein onto said sprayer to be discharged thereby transversely into the material in said curtain to commingle the same therewith.

4. A machine of the kind described having inner and outer hoppers for holding materials to be commingled, said outer hopper having a gate for causing the material therein to flow therefrom in the form of a cylindrical curtain, said inner hopper having a discharge throat extending through the open bottom of the outer hopper, and a revoluble sprayer in said curtain arranged to support the material in the discharge throat and discharge the same transversely into the material forming said curtain to commingle the same therewith.

5. The structure defined in claim 4 in further combination with a second gate co-operating with said sprayer to cause the respective material to leave said sprayer in the form of a thin sheet.

6. A machine of the kind described having inner and outer hoppers for holding materials to be comminged, a sleeve gate mounted on the inner hopper for axial adjustment and co-operating with the outer hopper to cause the material therein to flow therefrom in the form of a cylindrical curtain, said inner hopper having a discharge throat extending through the open bottom of the outer hopper, a revoluble sprayer mounted in said curtain to turn about the axis thereof, and arranged to support the material in the discharge throat and discharge the same transversely into the material forming said curtain to commingle the same therewith.

7. The structure defined in claim 6 in further combination with a second sleeve gate mounted on the discharge throat for axial adjustment and co-operating with said sprayer to cause the material therein to be discharged therefrom in a thin sheet.

8. The structure defined in claim 4 in further combination with an agitator in the discharge throat.

9. In a machine of the kind described, the combination with a drum, of a revoluble mixer in the drum, means for feeding material in the mixer in the form of a cylindrical curtain, a sprayer in the curtain, means for feeding material to said sprayer to be discharged thereby transversely into the material in said curtain to commingle the same therewith, and a return deck arranged to receive material centrifugally discharged from the mixer.

10. The structure defined in claim 9 in which the mixer has at its outer extremity a plurality of circumferentially spaced baffles.

In testimony whereof I affix my signature.

ROBERT J. OWENS.